(12) United States Patent
MacDonald, Jr. et al.

(10) Patent No.: US 6,430,400 B1
(45) Date of Patent: Aug. 6, 2002

(54) DETACHABLE FLIP COVER ASSEMBLY FOR A PORTABLE PHONE

(75) Inventors: James D. MacDonald, Jr., Apex; Yawei Ma, Raleigh, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 1046 days.

(21) Appl. No.: 08/586,434

(22) Filed: Jan. 16, 1996

(51) Int. Cl.⁷ .................................................. H04B 1/38
(52) U.S. Cl. ...................... 455/90; 455/550; 455/575
(58) Field of Search ........................... 455/12.1, 89, 90, 455/129, 347, 575, 550; 379/58, 59, 429, 433, 440; 343/700 MS; 16/356, 357

(56) References Cited

U.S. PATENT DOCUMENTS

| D289,288 S | 4/1987 | Muenscher et al. ........... D14/63 |
| D298,244 S | 10/1988 | Watanabe ..................... D14/64 |
| 4,816,838 A | 3/1989 | Mizuno et al. ............. 343/771 |
| 4,829,591 A | 5/1989 | Hashimoto et al. ........... 455/89 |
| 4,973,972 A | * 11/1990 | Huang ................. 343/700 MS |
| 4,980,694 A | 12/1990 | Hines ........................ 343/702 |
| D315,731 S | 3/1991 | Watanabe .................. D14/148 |
| 5,001,492 A | 3/1991 | Shapiro et al. ...... 343/700 MS |
| 5,014,346 A | 5/1991 | Phillips et al. ................ 455/89 |
| D325,029 S | 3/1992 | Nagele et al. ............. D14/138 |
| 5,170,173 A | 12/1992 | Krenz et al. ................ 343/702 |
| 5,218,370 A | 6/1993 | Blaese ........................ 343/702 |
| 5,231,407 A | 7/1993 | McGirr et al. ....... 343/700 MS |
| 5,258,892 A | 11/1993 | Stanton et al. .............. 361/814 |
| 5,303,291 A | * 4/1994 | Takagi et al. ............... 379/433 |
| 5,337,061 A | 8/1994 | Pye et al. .................... 343/702 |
| D352,503 S | 11/1994 | Nagele ...................... D14/138 |
| D353,587 S | 12/1994 | Taylor ....................... D14/138 |
| D355,182 S | 2/1995 | Namba ....................... D14/138 |
| 5,392,054 A | 2/1995 | Bottomley et al. ......... 343/702 |
| D356,084 S | 3/1995 | Nagele et al. ............. D14/138 |
| D359,734 S | 6/1995 | Nagele et al. ............. D14/138 |
| 5,422,651 A | 6/1995 | Chang ........................ 343/749 |
| 5,436,633 A | 7/1995 | Liu ............................. 343/723 |
| 5,451,965 A | 9/1995 | Matsumoto ................. 343/702 |
| D363,069 S | 10/1995 | Bro ........................... D14/191 |
| D363,716 S | 10/1995 | Siddoway et al. ......... D14/138 |
| 5,463,406 A | 10/1995 | Vannatta et al. ............ 343/725 |
| 5,467,477 A | 11/1995 | Furuta et al. ................ 455/348 |
| 5,513,383 A | * 4/1996 | Tsao ............................ 455/89 |
| 5,535,432 A | * 7/1996 | Dent ......................... 455/12.1 |
| 5,564,076 A | 10/1996 | Auvray ........................ 455/76 |
| 5,628,089 A | * 5/1997 | Wilcox et al. .............. 379/433 |

FOREIGN PATENT DOCUMENTS

EP            0 611 199 A1    2/1994

* cited by examiner

Primary Examiner—Lester G. Kincaid
(74) Attorney, Agent, or Firm—Coats & Bennett, P.L.L.C.

(57) ABSTRACT

A portable phone is disclosed as including a main housing, circuitry located within the main housing for operating the portable phone in a designated mode of communication, a support bracket assembly detachably coupled to the main housing, a flip cover rotatably secured to the support bracket assembly about a first axis, and an antenna coupled to the circuitry for transmitting and receiving signals in the designated communication mode associated with the flip cover. The flip cover is also rotatable about a second axis with respect to the support bracket assembly, which is substantially perpendicular to the first axis. The support bracket assembly includes a support bracket having a slotted portion at one end sized to receive an end of the main housing, a latching mechanism for coupling the support bracket to the main housing, a hinge mechanism located at the other end of the support bracket to rotatably couple the support bracket to the flip cover about the first axis, and a yoke having an annular step which captures the flip cover so it can rotate about the second axis. The designated mode of communication may be cellular and/or satellite.

48 Claims, 4 Drawing Sheets

DETACHABLE FLIP COVER ASSEMBLY FOR A PORTABLE PHONE

BACKGROUND OF THE INVENTION

1. Field of the Invention

The present invention relates to a portable phone and, more particularly, to a support bracket assembly for detachably coupling a flip cover to a main housing of such portable phone.

2. Description of Related Art

Portable cellular phones, which typically transmit and receive signals at a frequency of approximately 900 Megahertz, are well known and have been utilized for the last several years. Recently, however, it has become important for a second mode of communication, i.e., satellite, to be employed in areas where cellular communication is unavailable due to the lack of necessary cellular towers or stations. Such satellite communication occurs at frequencies within the L-band, and generally in the range of 1.0 to 30.0 Gigahertz.

It is recognized that separate antennas are necessary for cellular and satellite modes of communication since cellular antennas are linearly polarized and satellite antennas are circularly polarized. A further difference is that the satellite communication mode involves a directional component, where link margin is increased when the satellite antenna is pointed toward the satellite, and the cellular communication mode does not. Thus, the positioning of the satellite antenna in the portable phone is very important, as is the construction of the satellite antenna.

Flip covers for portable phones have generally been used to protect the keypad or display and has only extended over part of the phone base. In certain applications, though, a flip cover has been utilized to house an antenna (e.g., U.S. Pat. No. 5,337,061, U.S. Pat. No. 5,258,892, U.S. Pat. No. 5,014,346, and U.S. Pat. No. 5,170,173). As will be seen herein, each of the antennas disclosed in these patents is of a different construction than the satellite antenna of the present invention. Additionally, the mechanical coupling of the flip cover to the main housing in such patents involves rotation about a single axis between an open and a closed position.

Moreover, it will be noted that portable phones including antennas in such flip covers are made with the intention that the flip cover remain coupled to the main housing thereof. This can be problemmatic in the case where a user desires to position the portable phone in a docking station, a car cradle adapter, or the like since such accessories generally have their own antenna. While it is possible for the fixed antenna within the flip cover to be disconnected when the phone is in such an accessory, electrical performance has been known to suffer due to the mechanical switches required. Thus, there are many instances where it is desirable for the user to be able to freely change antennas when required without the need for such switching components.

In light of the foregoing, a primary object of the present invention is to provide a portable phone which is able to operate in the dual modes of satellite and cellular communication.

Another object of the present invention is to provide an antenna system for a portable phone which is able to operate in the dual modes of satellite and cellular communication.

A further object of the present invention is to provide an antenna system for a portable phone operable in a satellite communication mode which has an improved gain/temperature ratio for better link margin.

Yet another object of the present invention is to provide a flip cover for housing the satellite antenna of a portable phone, where the flip cover is uniquely coupled to the main housing to enable better orientation of the satellite antenna with respect to the applicable satellite.

Still another object of the present invention is to provide a flip cover assembly which is detachably coupled to the main housing of a portable phone.

Another object of the present invention is to provide a support bracket assembly for detachably coupling a flip cover to the main housing of a portable phone.

A still further object of the present invention is to provide a support bracket assembly for detachably coupling a flip cover to the main housing of a portable phone, where the flip cover is able to rotate about two separate axes with respect to such support bracket.

Another object of the present invention is to provide a portable phone with a detachable antenna system to facilitate connection to the antenna of a docking station.

Yet a further object of the invention is to simplify the design of accessories of a portable satellite phone.

These objects and other features of the present invention will become more readily apparent upon reference to the following description when taken in conjunction with the following drawing.

SUMMARY OF THE INVENTION

In accordance with the present invention, a portable phone is disclosed as including a main housing, circuitry located within the main housing for operating the portable phone in a designated mode of communication, a support bracket assembly detachably coupled to the main housing, a flip cover rotatably secured to the support bracket assembly about a first axis, and an antenna coupled to the circuitry for transmitting and receiving signals in the designated communication mode integrated with the flip cover. The flip cover is also rotatable about a second axis with respect to the support bracket assembly, which is substantially perpendicular to the first axis. The support bracket assembly includes a support bracket having a slotted portion at one end sized to receive an end of the main housing, a latching mechanism for coupling the support bracket to the main housing, and a hinge mechanism located at the other end of the support bracket to rotatably couple the support bracket to the flip cover about the first axis. The designated mode of communication may be cellular and/or satellite.

In a second aspect of the invention, a support bracket assembly for coupling a flip cover to a main housing of a portable phone is disclosed as including a support bracket having a first end with a slotted portion sized to receive an end of the main housing, a latching mechanism for coupling the support bracket to the main housing, and a hinge mechanism rotatably coupling the flip cover and a second end of the support bracket about a first axis. The hinge mechanism also provides an annular surface so that the flip cover is rotatable about a second axis with respect to the support bracket.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
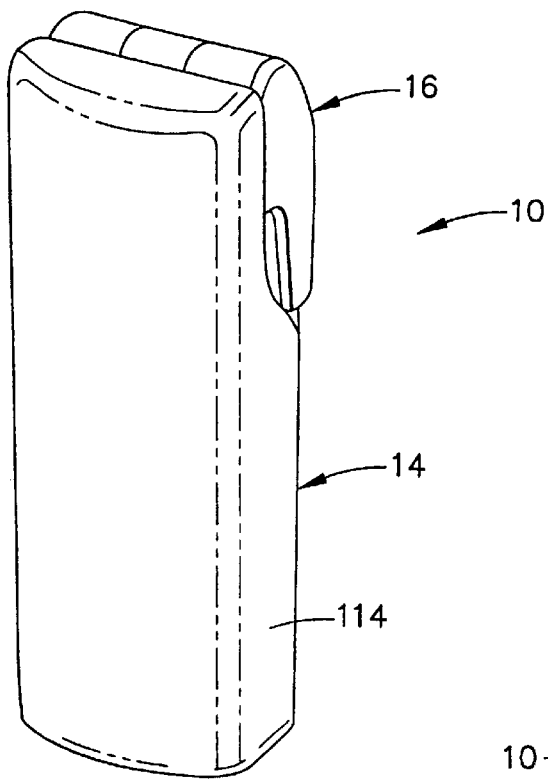
FIG. 1 is a perspective view of the portable phone of the present invention, where the flip cover is in a closed position.
Figure 2:
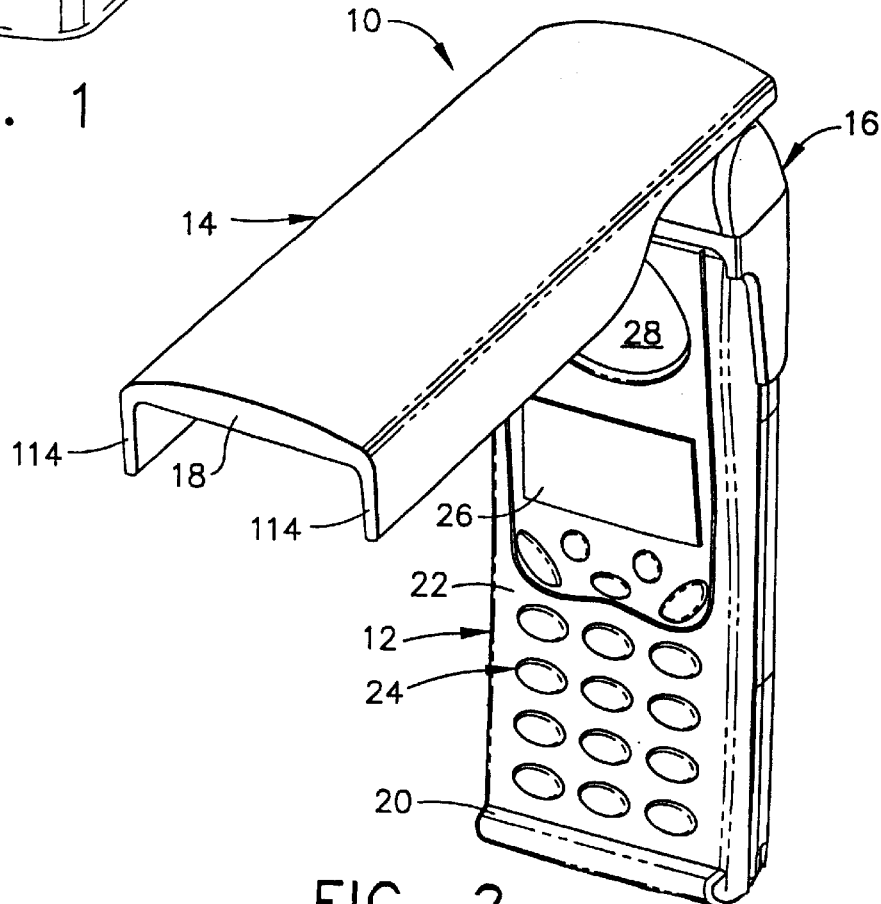
FIG. 2 is a perspective view of the portable phone depicted in FIG. 1, where the flip cover has been rotated partially open about a first axis.
Figure 3:
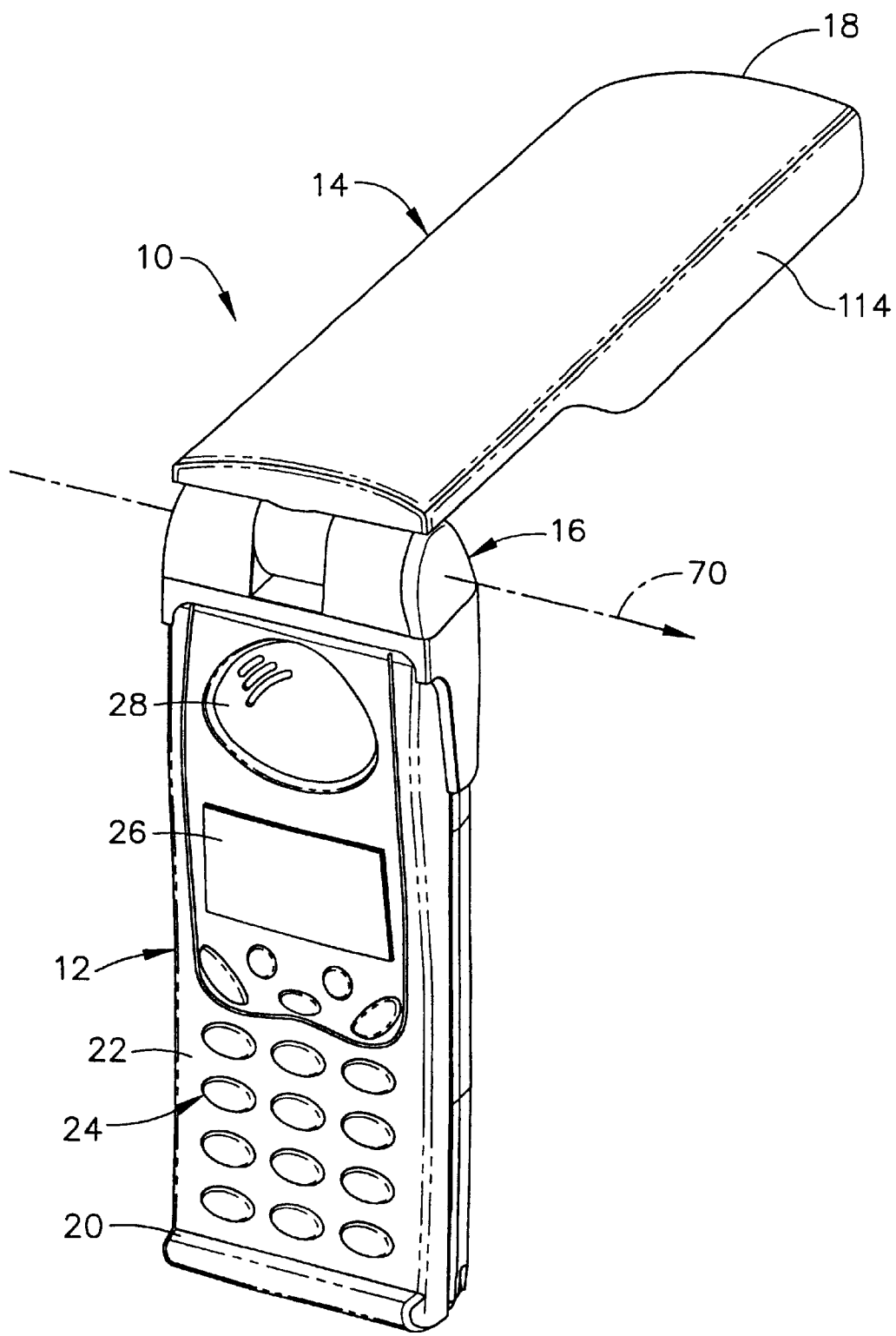
FIG. 3 is a perspective view of the portable phone depicted in FIGS. 1 and 2, where the flip cover has been rotated sideways about a second axis.

Referring now to the drawing in detail, wherein identical numerals indicate the same elements throughout the figures, FIGS. 1–3 depict a handheld portable phone capable of operating the dual modes of cellular and satellite communication and is indicated generally by the numeral 10. It will be seen that portable phone 10 includes a main housing 12 and a flip cover 14 which are interconnected by means of a support bracket assembly shown generally by the numeral 16. Flip cover 14 is shown as being in the closed position in FIG. 1, where a distal end 18 thereof engages a receiving ledge 20 on a top surface 22 of main housing 12 so as to lie over substantially all of top surface 22. It will be noted from FIGS. 2 and 3 that top surface 22 of main-housing 12 offers access to a keypad 24, a display 26, and a speaker 28. Also, while not shown, it will be understood that main housing 12 includes circuitry therein enabling portable phone 10 to communicate in both the cellular and satellite modes of communication, such as shown and described in a patent application entitled "Dual Mode Satellite/Cellular Terminal," Ser. No. 08/501,575, which is owned by the assignee of the present invention and is hereby incorporated by reference.

Portable phone 10 further includes a first antenna 30 coupled to the cellular circuitry in main housing 12 for receiving and transmitting signals in the cellular mode and a second antenna 32 coupled to the satellite circuitry in main housing 12 for receiving and transmitting signals in the satellite mode. As seen in FIG. 5, it is preferred that first antenna (which is linearly polarized) be a printed circuit antenna 30a located on an interior surface of flip cover 14. Alternatively, first antenna 30 may be a wire monopole type antenna 30b (shown in phantom in FIG. 4) housed within flip cover 14.

Figure 4:
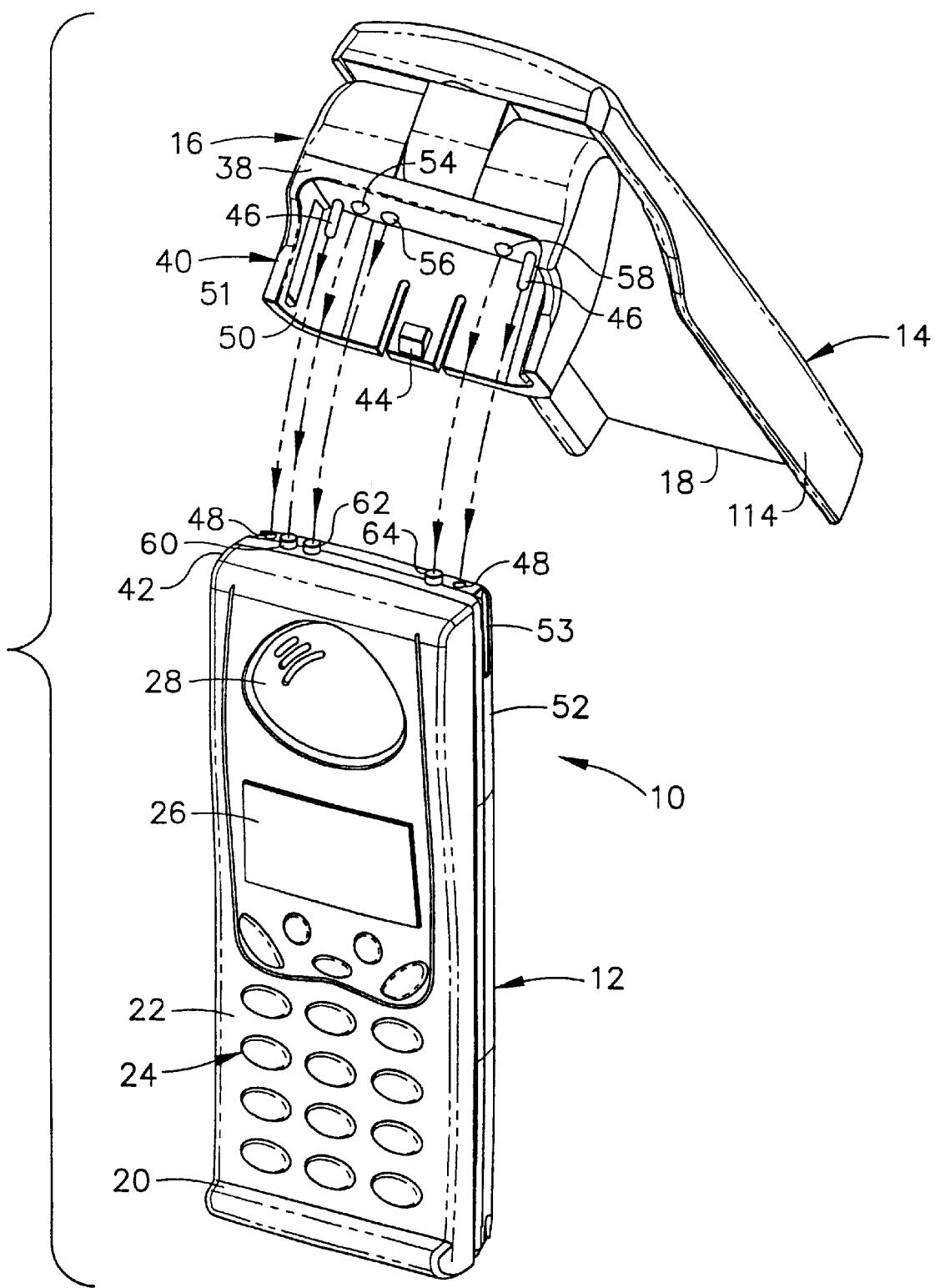
FIG. 4 is an exploded, perspective view of the portable phone depicted in FIGS. 1–3, where the support bracket assembly has been removed from the main housing.
Figure 5:
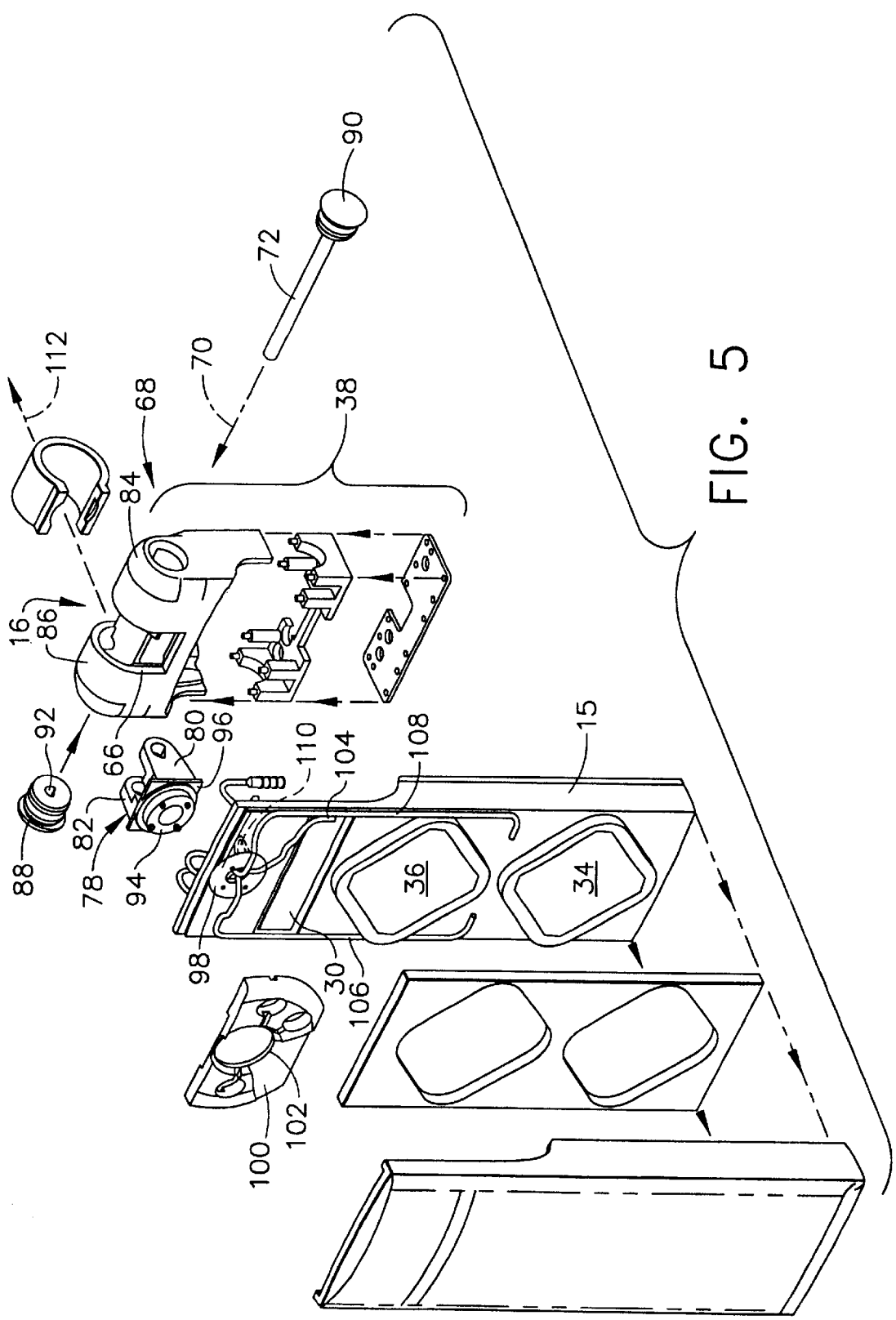
FIG. 5 is an exploded, perspective view of the flip cover and support bracket assembly depicted in FIG. 4.

As seen in FIG. 4, second antenna 32 preferably is comprised of a first patch antenna element 34 for transmitting signals to a satellite and a second patch antenna element 36 for receiving signals from a satellite, although a single patch antenna element may be utilized to perform both functions. The construction of flip cover 14 and the mounting of first and second patch antenna elements 34 and 36 is described in greater detail in a patent application filed concurrently herewith entitled "Flip Cover and Antenna Assembly for a Portable Phone," Ser. No. 08/886,432 which is also owned by the assignee of the present invention and is hereby incorporated by reference. In order to minimize interference, first and second patch antenna elements 34 and 36 are tuned to separate frequency bandwidths of operation, depending on those available. Accordingly, it is preferred that first patch antenna element 34 transmit signals to a satellite within a first frequency bandwidth (e.g., approximately 1.626 to approximately 1.661 Gigahertz) and second patch antenna element 36 receive signals from a satellite within a second frequency bandwidth (e.g., approximately 1.525 to approximately 1.560 Gigahertz). It will be noted that each of the frequency bandwidths of operation for first and second patch antenna elements 34 and 36 are approximately 0.035 Gigahertz and are much higher than the normal operational frequency for the cellular mode of communication, which is approximately 900 Megahertz.

Since the satellite mode of communication involves a directional component, whereby link margin between portable phone 10 and an applicable satellite is improved when second antenna 32 is positioned in alignment therewith, an important aspect of the present invention is to provide a configuration in which second antenna 32 may be maneuvered into position without undue effort. Additionally, because the radiation to the user is to be minimized and the ratio of gain to temperature is directly related to link margin, it would be advantageous for second antenna 32 to be located away from the user of portable phone 10. By positioning first and second patch antenna elements 34 and 36 within flip cover 14, with transmitting patch antenna element 34 being located near flip cover distal end 18, each of these objectives is met.

With respect to the coupling of flip cover 14 and main housing 12, one option is disclosed in a patent application filed concurrently herewith entitled "Antenna System for Dual Mode Satellite/Cellular Portable Phone," Ser. No. 08/586,435 which is also owned by the assignee of the present invention and is hereby incorporated by reference. However, the manner of directly coupling flip cover 14 and main housing 12 therein does not permit easy detachment so main housing 12 can be positioned within a docking station, car cradle adapter, or other accessory so that the antenna associate with such accessory can be utilized more effectively. In accordance with the present invention, then, a support bracket assembly 16 is utilized to indirectly couple flip cover 14 and main housing 12.

More specifically, support bracket assembly 16 includes a support bracket 38 having a first slotted portion 40 sized to receive an end 42 of main housing 12 and a latching mechanism 44 (e.g., in the form of a detent)for coupling support bracket 38 to main housing 12. In order to facilitate the coupling of support bracket 38 and main housing 12, first slotted portion 40 of support bracket has at least one guide pin 46 positioned therein (see FIG. 4) which is received within a corresponding opening 48 in main housing 12 and preferably a dovetail type guide located on the side surfaces 50 and 52 thereof, respectively. Each dovetail guide includes a male member 51 associated with first slotted portion 40 of support bracket 38 and a complementary female member 53 associated with main housing 12. Connectors 54, 56, and 58 are also provided within first slotted portion 40 which are connected to leads for first antenna 30, first patch antenna element 34, and second patch antenna element 36, respectively. Complementing this arrangement are connectors 60, 62, and 64 retained within and extending from main housing end 42 which are connected to the internal operating circuitry therein. When support bracket 38 is coupled to main housing 12, their respective connectors are aligned and brought into engagement. Preferably, connectors 54, 56, 58, 60, 62, and 64 are blind mate coaxial cable connectors.

Support bracket 38 also includes a second slotted portion 66 (see FIG. 5) at the end opposite first slotted portion 40, where it is rotatably coupled with flip cover 14. This is accomplished by means of a hinge mechanism 68 which enables flip cover 14 to rotate about a first axis 70 running longitudinally through a shaft 72 therein. Shaft 72 extends between a pair of bearings 80 and 82 in a yoke 78, as well as support bracket end portions 84 and 86 located on each side of second slotted portion 66, with the ends thereof being captured by a pair of bearings 88 and 90. It will be noted that shaft 72 has a D-shaped cross-section which enables its ends to fit into corresponding D-shaped openings 92 in bearings 88 and 90 (only one of which is shown in FIG. 5 with respect to bearing 88). This configuration acts as a stop to prevent flip cover 14 from over-rotating about first axis 70, the range of rotation being from 0° to approximately 180° (in one direction or the other).

Yoke 78 includes an annular step 94 with an opening therethrough at a middle portion 96. Yoke 78 is then bolted to collar 98 by means of annular step 94. Collar 98 is also used to capture a cable relief device 100 through an opening 102 therein. Cable relief device 100, in turn, is utilized to receive and properly position leads 104, 106, and 108 from first antenna 30, first patch antenna element 34, and second patch antenna element 36, respectively. It will be understood that flip cover 14 has an inner member 15 which is captured between annular step 94 of yoke 78 and collar 98, where it is able to rotate about the outer surface of annular step 94 (a second axis 112 being defined through yoke 78 and collar 98. of course, flip cover 14 must rotate a minimum amount about first axis 70 before it will be able to rotate about second axis 112. In order to prevent undue bending stresses on leads 104, 106, and 108, a boss 110 may be positioned on collar to prevent rotation of flip cover 14 about second axis 112 more than a prescribed amount (i.e., +180°). It will be noted that the opening through collar 98 and annular step 94 in yoke 78 permits leads 104, 106, and 108 to traverse hinge mechanism 68.

It will also be seen from FIGS. 1–3 that flip cover 14 preferably is substantially planar in configuration. Flip cover 14 may also include a flange 114 which extends at least partially around the perimeter thereof and wraps around the corresponding edges of main housing 12.

Having shown and described the preferred embodiments of the invention, further adaptations of the portable phone and support bracket assembly coupling the flip cover and main housing thereof disclosed herein can be accomplished by one of ordinary skill in the art without departing from the scope of the invention.

What is claimed is:

1. A portable phone, comprising:
   (a) a main housing having a top portion, a bottom portion, a front portion, and a rear portion;
   (b) circuitry located within said main housing for operating said portable phone in a designated communication mode;
   (c) a support bracket assembly slidably and detachably coupled over and to said top portion of said main housing;
   (d) a flip cover rotatably secured to said support bracket assembly about a first axis; and
   (e) an antenna coupled to said circuitry for transmitting and receiving signals in said designated communication mode, said antenna being integrated with said flip cover.

2. The portable phone of claim 1, said circuitry being operable in a cellular communication mode.

3. The portable phone of claim 2, said antenna further comprising a printed circuit antenna located on an interior surface of said flip cover.

4. The portable phone of claim 2, said antenna further comprising a monopole antenna housed within said flip cover.

5. The portable phone of claim 2, wherein said cellular circuitry operates at a frequency of approximately 900 Megahertz.

6. The portable phone of claim 1, said circuitry being operable in a satellite communication mode.

7. The portable phone of claim 6, said antenna further comprising a single patch antenna element for receiving signals from and transmitting signals to a satellite.

8. The portable phone of claim 6, said antenna further comprising:
   (a) a first patch antenna element for receiving signals from a satellite; and
   (b) a second patch antenna element for transmitting signals to a satellite.

9. The portable phone of claim 8, wherein said first patch antenna element transmits signals within a frequency bandwidth of approximately 1.525 to approximately 1.560 Gigahertz.

10. The portable phone of claim 8, wherein said second patch antenna element receives signals within a frequency bandwidth of approximately 1.626 to approximately 1.661 Gigahertz.

11. The portable phone of claim 6, wherein said satellite circuitry operates within a frequency bandwidth of approximately 1.0–30.0 Gigahertz.

12. The portable phone of claim 1, said flip cover also being rotatable about a second axis with respect to said support bracket assembly.

13. The portable phone of claim 12, wherein said first axis is oriented substantially perpendicular to said second axis.

14. The portable phone of claim 12, wherein said flip cover is rotatable about said second axis in a range of 0° to 180°.

15. The portable phone of claim 12, wherein rotation about said second axis cannot occur until said flip cover has been rotated about said first axis a minimum amount.

16. The portable phone of claim 1, wherein said flip cover is rotatable about said first axis in a range of 0°–180°.

17. The portable phone of claim 1, said flip cover being sized to lie over substantially all of said main housing front portion when in a closed position.

18. The portable phone of claim 1, said support bracket assembly further comprising:
   (a) a support bracket; and
   (b) a hinge mechanism coupling said flip cover and said support bracket.

19. The portable phone of claim 18, said flip cover being rotatable about a second axis substantially perpendicular to said first axis.

20. The portable phone of claim 19, said support bracket assembly further comprising:
   (a) a yoke having a first bearing at one end, a second bearing at the other end, and a middle portion connecting said first and second bearings, said middle portion including an annular step thereon; and
   (b) a collar attached to said middle portion of said yoke, said collar having an opening therethrough aligned with said annular step on said middle portion opening;
   wherein said flip cover is retained between said collar and said yoke to rotate about said annular step.

21. The portable phone of claim 20, further comprising a stop associated with said collar to prevent said flip cover from rotating more than a maximum angle about said second axis.

22. The portable phone of claim 20, said collar and said annular step having openings therethrough so that means for coupling said antenna to said circuitry is able to traverse said hinge mechanism.

23. The portable phone of claim 19, said support bracket including a slotted portion adjacent said flip cover, wherein said slotted portion is sized to accommodate rotation of said flip cover about said second axis.

24. The portable phone of claim 18, further comprising a stop associated with said hinge mechanism to prevent said flip cover from rotating more than a maximum angle about said first axis.

25. The portable phone of claim 1, wherein said flip cover is substantially planar in configuration.

26. The portable phone of claim 25, said flip cover including a flange extending from at least a portion of the perimeter thereof, wherein said flange wraps around corresponding side portions of said main housing.

27. The portable phone of claim 1, said flip cover further comprising:
   (a) a first substantially planar section coupled to said support bracket assembly; and
   (b) a second substantially planar section oriented at an angle to said flip cover first section, said flip cover second section lying over said main housing when in a closed position.

28. The portable phone of claim 27, said flip cover second section including a flange extending from the perimeter thereof, wherein said flange wraps around corresponding side portions of said main housing.

29. The portable phone of claim 1, said support bracket assembly further comprising:
   (a) a support bracket having a slotted portion sized to receive an end of said main housing; and
   (b) a latching mechanism for coupling said support bracket to said main housing.

30. The portable phone of claim 29, said support bracket assembly further comprising at least one guide pin positioned within said support bracket slotted portion and said main housing including a corresponding opening in a top surface thereof for receiving each said guide pin.

31. The portable phone of claim 30, wherein said support bracket and said main housing connectors are blind mate coaxial cable connectors.

32. The portable phone of claim 29, said support bracket assembly further comprising at least one male member of a dovetail guide positioned within said support bracket slotted portion and said main housing including a corresponding female member of said dovetail guide for receiving each said dovetail guide male member substantially parallel to a front portion of said main housing.

33. The portable phone of claim 29, said support bracket assembly further comprising at least one connector positioned within said support bracket slotted portion coupled to said antenna and said main housing including a corresponding connector for each said support bracket connector along a top surface thereof, wherein coupling of said support bracket and said main housing connectors provide coupling of said antenna to said circuitry.

34. The portable phone of claim 1, said main housing including a switch mechanism for disconnecting said circuitry from said antenna when said main housing is decoupled from said support bracket assembly, wherein said main housing can be connected to a separate antenna associated with a docking station.

35. The portable phone of claim 1, wherein said circuitry is operable in both a cellular communication mode and a satellite communication mode, said portable phone further comprising:

(a) a first antenna coupled to said cellular circuitry for receiving and transmitting signals within a cellular frequency bandwidth; and
   (b) a second antenna coupled to said satellite circuitry for receiving and transmitting signals within a satellite frequency bandwidth;
   wherein at least one of said first and second antennas is located within said flip cover.

36. A support bracket assembly for indirectly and detachably coupling a flip cover and a main housing of a portable phone, comprising:
   (a) a support bracket having a first end with a slotted portion sized to slidably couple over and to a top portion of said main housing;
   (b) a latching mechanism for detachably coupling said support bracket and said main housing top portion; and
   (c) a hinge mechanism rotatably coupling said flip cover and a second end of said support bracket about a first axis.

37. The support bracket assembly of claim 36, said hinge mechanism being rotatable about a second axis substantially perpendicular to said first axis.

38. The support bracket assembly of claim 37, wherein said flip cover is rotatable about said second axis in a range of 0° to 180°.

39. The support bracket assembly of claim 37, further comprising:
   (a) a yoke having a first bearing at one end, a second bearing at the other end, and a middle portion connecting said first and second bearings, said middle portion including an annular step; and
   (b) a collar attached to said middle portion of said yoke, said collar having an opening aligned with said annular step on said middle portion;
   wherein an annular surface is provided at said annular step about which said flip cover can rotate about said second axis.

40. The support bracket assembly of claim 39, further comprising a stop associated with said collar to prevent said flip cover from rotating more than a maximum angle in each direction about said second axis.

41. The support bracket assembly of claim 39, said collar and said annular step having openings therethrough so that means for coupling an antenna to said circuitry is able to traverse said hinge mechanism.

42. The support bracket assembly of claim 37, said support bracket including a second slotted portion adjacent said flip cover at a second end, wherein said second slotted portion is sized to accommodate rotation of said flip cover about said second axis.

43. The support bracket assembly of claim 37, wherein rotation about said second axis cannot occur until said flip cover has been rotated about said first axis a minimum amount.

44. The support bracket assembly of claim 36, wherein said flip cover is rotatable about said first axis in a range of 0°–180°.

45. The support bracket assembly of claim 36, further comprising a stop associated with said hinge mechanism to prevent said flip cover from rotating more than a maximum angle about said first axis.

46. The support bracket assembly of claim 36, further comprising at least one guide pin positioned within said support bracket slotted portion and said main housing including a corresponding opening in a top surface thereof for receiving each said guide pin.

47. The support bracket assembly of claim 36, further comprising at least one male member of a dovetail guide positioned within said support bracket slotted portion and said main housing including a corresponding female member of said dovetail guide for receiving said dovetail guide male member substantially parallel to a front portion of said main housing.

48. The support bracket assembly of claim 36, further comprising at least one connector positioned within said support bracket slotted portion and said main housing including a corresponding connector for each said support bracket connector along a top surface thereof, wherein coupling of said support bracket and said main housing connectors provide coupling of an antenna located within said flip cover and circuitry for operating said portable phone located within said main housing.

\* \* \* \* \*